United States Patent
Shimizu

(10) Patent No.: US 9,203,991 B2
(45) Date of Patent: Dec. 1, 2015

(54) INFORMATION PROCESSING DEVICE, IMAGE PROCESSING CONTROL METHOD, AND RECORDING MEDIUM STORING IMAGE PROCESSING CONTROL PROGRAM

(71) Applicant: Naoki Shimizu, Kanagawa (JP)

(72) Inventor: Naoki Shimizu, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/317,067

(22) Filed: Jun. 27, 2014

(65) Prior Publication Data

US 2015/0015911 A1  Jan. 15, 2015

(30) Foreign Application Priority Data

Jul. 9, 2013  (JP) ................................ 2013-143802

(51) Int. Cl.
*H04N 1/00* (2006.01)

(52) U.S. Cl.
CPC ....... *H04N 1/00408* (2013.01); *H04N 1/00129* (2013.01); *H04N 1/00209* (2013.01)

(58) Field of Classification Search
None
See application file for complete search history.

(56) References Cited

U.S. PATENT DOCUMENTS

| | | | | |
|---|---|---|---|---|
| 7,385,722 | B2 * | 6/2008 | Yamade et al. | 358/1.15 |
| 2004/0010671 | A1 * | 1/2004 | Sampsa et al. | 711/165 |
| 2006/0039041 | A1 * | 2/2006 | Saeda et al. | 358/471 |
| 2008/0282196 | A1 * | 11/2008 | Park | 715/838 |
| 2008/0309644 | A1 * | 12/2008 | Arimoto | 345/173 |
| 2010/0161309 | A1 * | 6/2010 | Chartraire et al. | 703/28 |
| 2010/0180083 | A1 * | 7/2010 | Lee et al. | 711/128 |
| 2011/0292466 | A1 * | 12/2011 | Kino | 358/474 |
| 2012/0086416 | A1 * | 4/2012 | Kudo et al. | 323/265 |
| 2012/0243039 | A1 * | 9/2012 | Miyata et al. | 358/1.15 |
| 2013/0031346 | A1 * | 1/2013 | Sakarda | 713/2 |
| 2013/0070297 | A1 * | 3/2013 | Kato | 358/1.15 |
| 2013/0254297 | A1 * | 9/2013 | Kobayashi | 709/205 |
| 2014/0002857 | A1 * | 1/2014 | Huang et al. | 358/1.15 |
| 2014/0055828 | A1 * | 2/2014 | Kamma | 358/505 |
| 2014/0063537 | A1 * | 3/2014 | Nishikawa et al. | 358/1.15 |
| 2014/0085654 | A1 * | 3/2014 | Miyazaki | 358/1.13 |
| 2014/0092413 | A1 * | 4/2014 | Shibata | 358/1.13 |
| 2014/0096202 | A1 * | 4/2014 | Matsuda | 726/4 |
| 2014/0118769 | A1 * | 5/2014 | Adachi et al. | 358/1.13 |

(Continued)

FOREIGN PATENT DOCUMENTS

| | | | |
|---|---|---|---|
| JP | 9-022458 | 1/1997 | |
| JP | 11-338781 | 12/1999 | |
| JP | 11338781 A | * 12/1999 | ............. G06F 12/16 |

*Primary Examiner* — Ted Barnes
(74) *Attorney, Agent, or Firm* — Oblon, McClelland, Maier & Neustadt, L.L.P.

(57) ABSTRACT

An information processing device, separate from an image processing apparatus, which controls the image processing apparatus and includes a display unit, a volatile memory store image data, and a nonvolatile memory. The information processing device also includes an image data acquisition unit that acquires image data processed by the image processing apparatus page by page, an image data storage processor that compares the image data acquired by the image data acquisition unit for each page with the image data stored in the volatile memory and to store the image data in either the volatile memory or the nonvolatile memory based on comparison, a display image generator that generates a display image to be displayed on the display unit based on the image data for each page stored in either the volatile memory or the nonvolatile memory, and a display image output controller that displays the display image generated by the display image generator on the display unit.

8 Claims, 13 Drawing Sheets

(56) References Cited

U.S. PATENT DOCUMENTS

| | | | |
|---|---|---|---|
| 2014/0176991 A1* | 6/2014 | Yun | 358/1.15 |
| 2014/0215244 A1* | 7/2014 | Hong | 713/323 |
| 2014/0226181 A1* | 8/2014 | Shibukawa et al. | 358/1.15 |
| 2014/0273864 A1* | 9/2014 | Arai | 455/66.1 |
| 2014/0355047 A1* | 12/2014 | Lee et al. | 358/1.15 |
| 2014/0355048 A1* | 12/2014 | Kang et al. | 358/1.15 |
| 2014/0355057 A1* | 12/2014 | Jang et al. | 358/1.15 |
| 2014/0359533 A1* | 12/2014 | Hahm et al. | 715/838 |
| 2014/0376037 A1* | 12/2014 | Onogi | 358/1.15 |
| 2015/0062648 A1* | 3/2015 | Okigami et al. | 358/1.15 |

* cited by examiner

INFORMATION PROCESSING DEVICE, IMAGE PROCESSING CONTROL METHOD, AND RECORDING MEDIUM STORING IMAGE PROCESSING CONTROL PROGRAM

CROSS-REFERENCE TO RELATED APPLICATION

This patent application is based on and claims priority pursuant to 35 U.S.C. §119(a) to Japanese Patent Application No. 2013-143802, filed on Jul. 9, 2013 in the Japan Patent Office, the entire disclosure of which is hereby incorporated by reference herein.

BACKGROUND

1. Technical Field

The present invention relates to an information processing device, an image processing control method, and a recording medium storing an image processing control program.

2. Background Art

With increased computerization of information, image processing apparatuses such as printers and facsimiles used for outputting the computerized information and scanners used for computerizing documents have become indispensable. In most cases, these image processing apparatuses are configured as multifunctional peripherals (MFPs) that can be used as a printer, facsimile, scanner, and copier by implementing an image capturing function, image forming function, communication function, etc.

On the other hand, mobile phones have also become highly advanced, and mobile information processing devices such as smart phones and tablet devices that have information processing functions approaching the sophistication of PCs (hereinafter referred to as "mobile devices") have become popular. Many mobile devices include interfaces such as a touch panel, UPS communication capability, velocity sensor, and wireless communications capability, and can be used for various purposes depending on the software. Consequently, those mobile devices can be used as a display panel to operate the image processing apparatuses described above remotely.

In systems that include those image processing apparatuses and mobile devices used as a control panel for those image processing apparatuses, in some cases, image data processed by the image processing apparatuses is stored in a memory included in the mobile devices temporarily and then processed. Generally, mobile devices include both nonvolatile memory such as NAND-type flash memory and volatile memory such as Random Access Memory (RAM). While the nonvolatile memory is high-capacity, there are limitations on the number of times they can be rewritten. Therefore, nonvolatile memory is not adequate data storage for programs that repeatedly rewrite data at short intervals. By contrast, volatile memory has no limitation on the number of rewritings and are suitable for programs that rewrite data at short intervals. However, a drawback of volatile memory is low-capacity and thus the inability to store large amounts of data.

In data recording apparatuses that include both nonvolatile memory and the volatile memory, in order to store large amounts of data such as measurements and various logs, etc., en block, a technology that stores data in the volatile memory temporarily and transfers the data stored in the volatile memory into the nonvolatile memory once memory usage exceeds a certain threshold to store new data in the volatile memory has been proposed.

SUMMARY

An example embodiment of the present invention provides an information processing device that is separate from an image processing apparatus and which controls operation of the image processing apparatus and includes volatile memory and nonvolatile memory. The information processing device includes an image data acquisition unit, an image data storage processor, a display image generator, and a display image output controller. The image data acquisition unit acquires image data processed by the image processing apparatus page by page. The image data storage processor compares the image data acquired by the image data acquisition unit for each page with image data already stored in the volatile memory and determines whether to store the image data acquired by the image data acquisition unit for each page in either the volatile memory or the nonvolatile memory. The display image generator generates a display image to be displayed on a display unit of the information processing device based on the image data for each page stored in either the volatile memory or the nonvolatile memory. The display image output controller displays the display image generated by the display image generator on the display unit of the information processing device.

Further example embodiments of the present invention provide an information processing control method and a non-transitory recording medium storing an information processing control program.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

DETAILED DESCRIPTION

Figure 1:
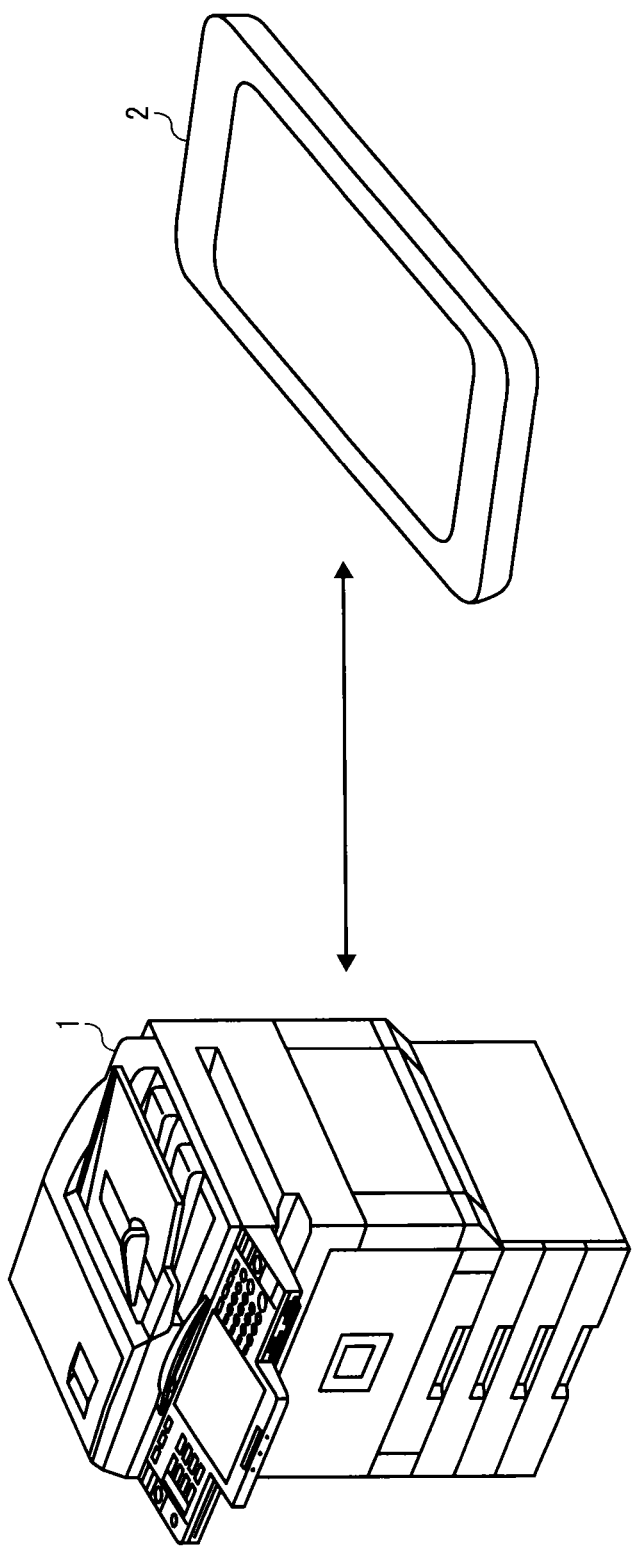
FIG. 1 is a diagram illustrating an image processing system as an embodiment of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

In the system that includes the image processing apparatus and the mobile device used as the control panel for the image processing apparatus, the mobile device receives a scanned image generated by a scanner included in the image processing apparatus and processes the received scanned image in some cases. More specifically, for example, the mobile device displays a thumbnail image of the received scanned image, receives selection of one or more thumbnail images among the displayed thumbnail images, and sends the scanned image that corresponds to the selected thumbnail image to a mail address of a user who uses the mobile device. In the process described above, it is necessary to store the received scanned images and the thumbnail images generated from the scanned images in a memory included in the mobile device until the process ends.

Since it is unnecessary to keep storing those scanned images in the memory included in the mobile device after finishing sending the scanned image by mail, it is possible to store those scanned images in the volatile memory described above temporarily and process those scanned images. However, if a lot of scanned images are generated in a single scanning operation, in some cases they cannot all be stored in the small volatile memory and processed. By contrast, while the nonvolatile memory can store a large amount of data as described above, the nonvolatile memory has limitations on the number of writing in, and the nonvolatile memory should not be frequently used for storing the scanned image that is stored temporarily in each scanning operation and deleted after finishing the process.

It should be noted that the issue described above is not limited to the case in which the scanned image that is scanned by the scanner and generated is processed on the mobile device. A similar issue can occur in a case in which the image data that the image processing apparatus processes is processed on the mobile device such as an image received by fax is processed on the mobile device.

In the following embodiment, in a system that includes an image processing apparatus and an information processing device, the image data processed by the image processing apparatus is effectively stored in the memory included in the mobile device that is used as the display panel to operate the image processing apparatus.

FIG. 1 is a diagram illustrating an image processing system in this embodiment. As shown in FIG. 1, in the image processing system of the present embodiment, an image processing apparatus 1 and a mobile device 2 are communicably connected with each other.

In the present embodiment, the image processing apparatus 1 is a MFP that implements an image pickup function, image forming function, and communication function and can be used as a printer, facsimile, scanner, and copier. The mobile device 2 is a portable information processing device such as a smart phone, tablet device, and Personal Digital Assistant (PDA). In this embodiment, the mobile device 2 is an information processing device controlled independently from the main unit of the image processing apparatus 1 and functions as a control panel to control the image processing apparatus 1 by installing application programs provided by a manufacturer of the image processing apparatus and a third party. In addition, the mobile device 2 in this embodiment includes a function of receiving a scanned image scanned and generated by the image processing apparatus 1, generating a thumbnail image from the received scanned image, and processing those images. It should be noted that the image processing apparatus 1 can include a scanning function only.

Figure 2:
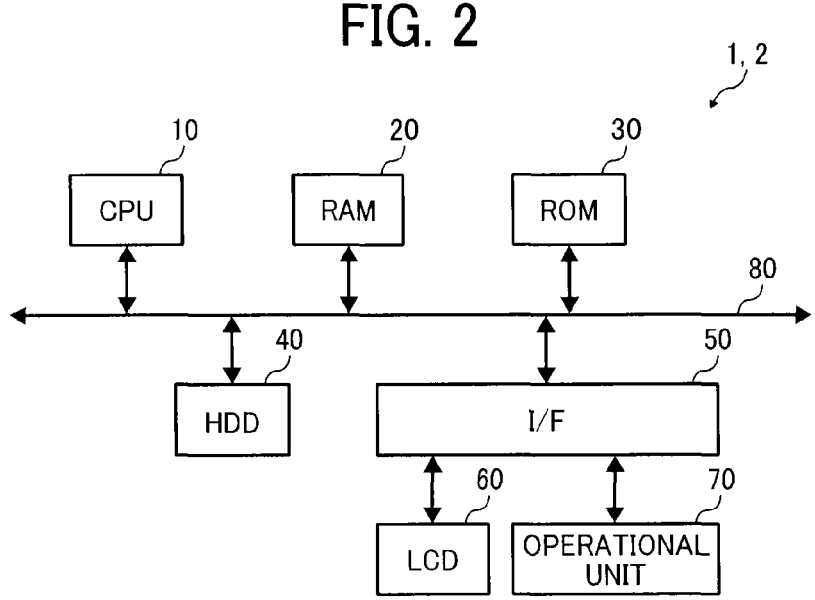
FIG. 2 is a block diagram illustrating a hardware configuration of an information processing device as an embodiment of the present invention.

Next, hardware of the image processing apparatus 1 and the mobile device 2 included in the image processing system of this embodiment is described below. FIG. 2 is a block diagram illustrating a hardware configuration of the information processing device in this embodiment. As shown in FIG. 2, the information processing device in this embodiment includes the same configuration as a general server or PC etc.

That is, in the information processing device in this embodiment, a Central Processing Unit (CPU) 10, a Random Access Memory (RAM) 20, a Read Only Memory (ROM) 30, a hard disk drive (HDD) 40, and an interface (I/F) 50 are connected with each other via a bus 80. In addition, a Liquid Crystal Display (LCD) 60 and an operational unit 70 are connected to the I/F 50. Besides, the image processing apparatus 1 includes an engine that executes forming an image, outputting the image, and scanning.

The CPU 10 is a processor and controls the whole operation of the information processing device. The RAM 20 is volatile memory that can read/write information at high speed and is used as a work area when the CPU 10 processes information. The ROM 30 is a read-only nonvolatile memory and stores programs such as firmware. The HDD 40 is a nonvolatile memory that can read/write information and stores the OS, various control programs, and application programs etc. In the mobile device 2, instead of the ROM 30 and the HDD 40, a nonvolatile memory such as a NAND type flash memory is used as an internal storage that stores various programs and data.

The I/F 50 connects the bus 80 with various hardware and network, etc. and controls them. The LCD 60 is a visual user interface to check status of the information processing device. The operational unit 70 is a user interface such as a keyboard, mouse, various hardware buttons, and touch panel to input information to the information processing device. It should be noted that the mobile device 2 functions as the control panel of the image processing apparatus 1 in the system of this embodiment. Consequently, the user interfaces connected to the image processing apparatus 1 directly such as the LCD 60 and the operational unit 70 can be omitted.

In this hardware configuration described above, programs stored in storage devices such as the ROM 30, HDD 40, and optical discs (not shown in figures) are read to the RAM 20, and a software controlling unit is constructed by executing operation in accordance with the programs by the CPU 10. Functional blocks that implement functions of apparatuses that consist of the image processing system of this embodiment are constructed by a combination of the software controlling units described above and hardware.

Figure 3:
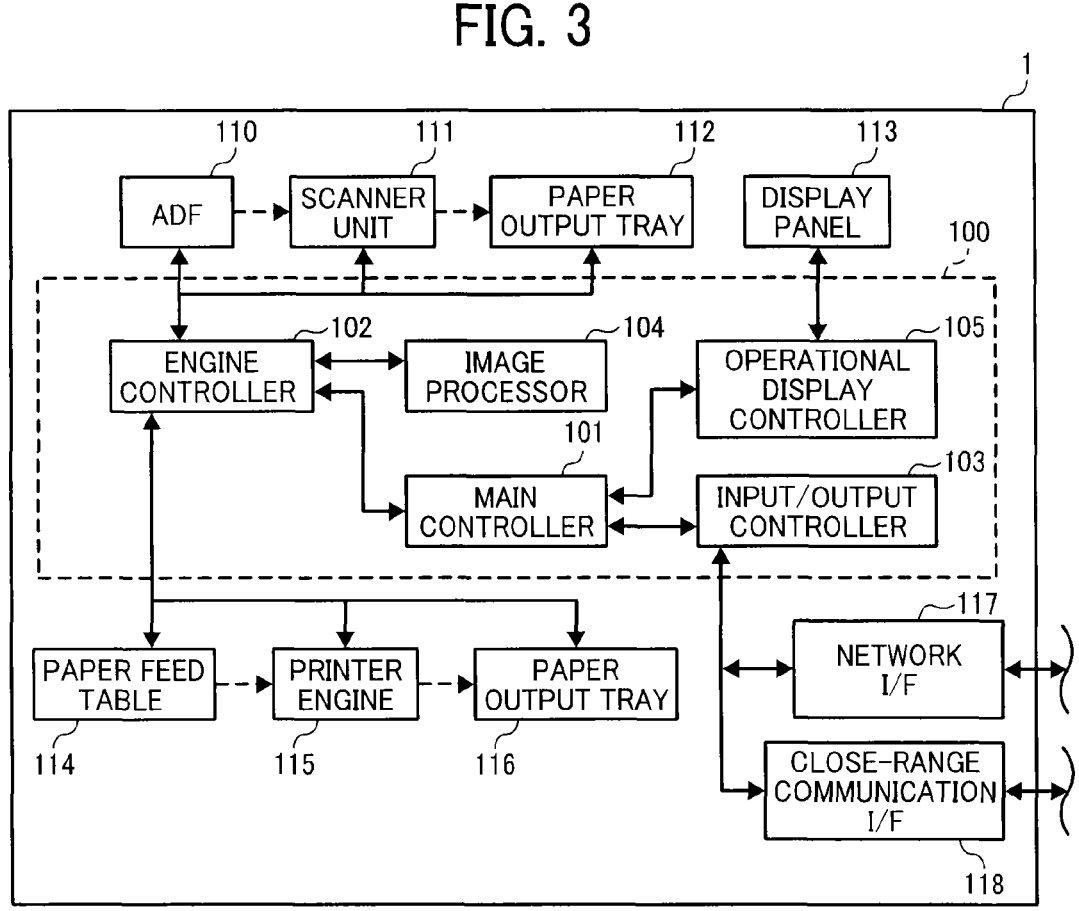
FIG. 3 is a block diagram illustrating a functional configuration of an image processing apparatus as an embodiment of the present invention.

Next, functions of the image processing apparatus 1 in this embodiment are described below. FIG. 3 is a block diagram illustrating a functional configuration of the image processing apparatus 1. As shown in FIG. 3, the image processing apparatus 1 includes a controller 100, an Auto Document Feeder (ADF) 110, a scanner unit 111, a paper output tray 112, a display panel 113, a paper feed table 114, a print engine 115, a paper output tray 116, a network I/F 117, and a close-range communication I/F 118.

The controller 100 includes a main controller 101, an engine controller 102, an input/output controller 103, an image processor 104, and an operational display controller 105. As shown in FIG. 3, the image processing apparatus 1 in this embodiment is constructed as the MFP that includes the scanner unit 111 and the print engine 115. In FIG. 3, solid arrows indicate electrical connections, and dashed arrows indicate flow of paper.

The display panel 113 is both an output interface that displays status of the image processing apparatus 1 visually and an input interface (operational unit) to operate the image processing apparatus 1 directly or input information to the image processing apparatus 1. The network I/F 117 is an interface that the image processing apparatus 1 communicates with other apparatuses by wired communication, and Ethernet and USB interface are used for the network I/F 117.

The close-range communication I/F 118 is an interface that the image processing apparatus 1 communicates with other apparatuses by close-range wireless communication, and interfaces such as Bluetooth, Wireless Fidelity (Wi-Fi), and FeliCa are used as the close-range communication I/F 118.

The controller 100 combines software and hardware. In particular, control programs such as firmware stored in non-volatile memory such as the ROM 30 and the HDD 40 are loaded into the RAM 20, and the software controlling unit is implemented by executing operations by the CPU 10 in accordance with the programs. The controller 100 is constructed of the software controlling unit and hardware such as integrated circuits. The controller 100 functions as a controller that controls the whole part of the image processing apparatus 1.

The main controller 101 controls each unit included in the controller 100 and commands each unit in the controller 100. The engine controller 102 controls and drives the print engine 160 and the scanner unit 111. The input/output controller 103 inputs signals and commands input via the wired communication unit 180 and the wireless communication unit 190 to the main controller 101. In addition, the main controller 101 controls the input/output controller 103 and accesses other apparatuses via the network I/F 117.

The image processor 104 generates drawing information based on image information to be printed and output under the control of the main controller 101. The drawing information is information that the print engine 160 as an image forming unit draws as an image to be formed in an image forming operation. The image processor 104 processes image pickup data input from the scanner unit 111 and generates image data. The generated image data is stored in the image processing apparatus 1 as a result of the scanner operation or transferred to another apparatus via the network I/F 117. The operational display controller 105 displays information on the display panel 113 and reports information input via the display panel to the main controller 101.

In the case of image processing apparatus that only has the scanner function, the paper feed table 114, the print engine 115, and the paper output tray 116 shown in FIG. 3 are omitted, and functions to control the paper feed table 114, the print engine 115, and the paper output tray 116 are omitted from functions included in the engine controller 102.

If the image processing apparatus 1 functions as the printer, first, the input output controller 103 receives a print job via the network I/F 117. The input/output controller 103 transfers the received print job to the main controller 101. After receiving the print job, the main controller 101 generates the drawing information based on the document information and image information included in the print job by controlling the image generator 104. After the image generator 104 generates the drawing information, the engine controller 102 executes forming an image on paper carried from the paper feed table 114 based on the generated drawing information. As particular examples of the print engine 115, image forming mechanisms such as inkjet method and electrophotography method can be used. After the print engine 115 forms the image on the paper, the paper is ejected on the paper output tray 116.

If the image processing apparatus 1 functions as a scanner, in response to a command to execute scanning input by operation on the display panel 113 or from an external apparatus via the network I/F 117, the operational display controller 105 or the input/output controller 103 transfers a signal to execute scanning to the main controller 101. The main controller 101 controls the engine controller 102 based on the received signal to execute scanning. The engine controller 102 drives the ADF 110 and carries a document to be scanned set on the ADF 110 to the scanner unit 111. In addition, the engine controller 102 drives the scanner unit 111 and scans the document carried from the ADF 110. If the document is not set on the ADF 110 and the document is set on the scanner unit 111 directly, the scanner unit 111 scans the set document under the control of the engine controller 102. That is, the scanner unit 111 functions as the image pickup unit.

In scanning operation, an image pickup device such as CCD included in the scanner unit 111 scans the document optically, and image pickup information is generated based on the optical information. The engine controller 102 transfers the image pickup information generated by the scanner unit 111 to the image processor 104. The image processor 104 generates the image information based on the image pickup information received from the engine controller 102 under the control of the main controller 101. The image information generated by the image processor 104 is stored in the storage device such as the HDD 40 attached to the image processing apparatus 1. The image information generated by the image processor 104 is either stored in the HDD 40 etc. as is or transferred to an external apparatus by the input/output controller 103 via the network I/F 117 depending on the user command.

If the image processing apparatus 1 functions as a copier, the image processor 104 generates the drawing information based on either the image pickup information received from the scanner unit 111 by the engine controller 102 or the image information generated by the image processor 104. Similarly as the printer operation, the engine controller 102 drives the print engine 115 based on the drawing information.

Figure 4:
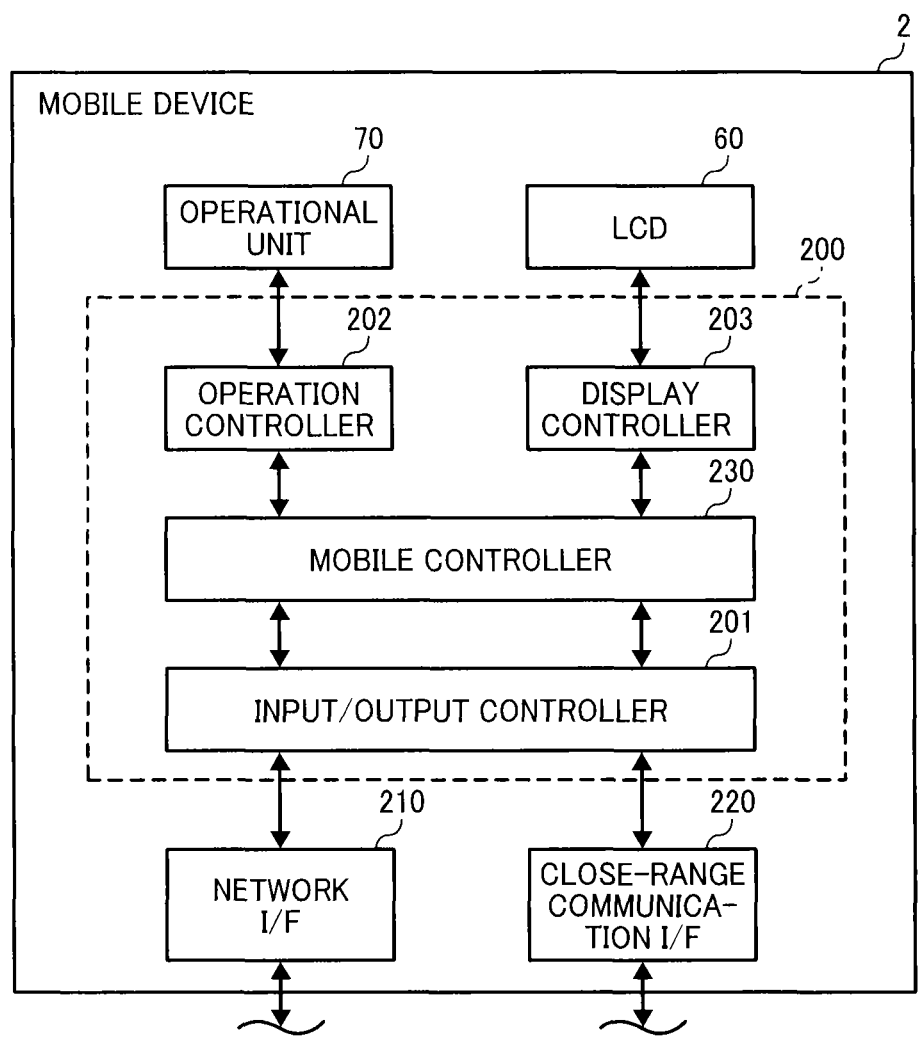
FIG. 4 is a block diagram illustrating a functional configuration of a mobile device as an embodiment of the present invention.

Next, a functional configuration of the mobile device 2 in this embodiment is described below with reference to FIG. 4. As shown in FIG. 4, the mobile device 2 in this embodiment includes a controller 200, a network I/F 210, and a close-range communication I/F 220 in addition to the LCD 60 and the operational unit 70 shown in FIG. 2. The controller 200 includes an input/output controller 201, an operation controller 202, a display controller 203, and a mobile controller 230.

The network I/F 210 is an interface that the mobile device 2 communicates with other apparatuses via a network, and Ethernet and USB interface are used for the network I/F 210. The close-range communication I/F 220 is an interface that the mobile device 2 communicates with other apparatuses by wireless communication, and interfaces such as Bluetooth, Wi-Fi, and FeliCa are used as the close-range communication I/F 220. The network I/F 210 and the close-range communication I/F 220 can be realized by the I/F 50 shown in FIG. 2.

The controller 200 combines software and hardware. The controller 200 controls the whole part of the mobile device 2. The input/output controller 201 acquires information input via the network I/F 210 and transfers information to other apparatuses via the network I/F 210. In addition, the input/output controller 201 acquires information input via the close-range communication I/F 220 and transfers information to other apparatuses via the close-range communication I/F 220.

The operation controller 202 acquires a signal of user operation on the operational unit 70 and input the signal to a module that operates on the mobile device 2 such as the mobile controller 230. The display controller 203 displays status of the mobile device 2 such as graphical user interface (GUI) of the mobile controller 230 on the LCD 60 as a display unit of the mobile device 2.

The mobile controller 230 controls the whole part of the mobile device 2 by commanding each unit by the controller 200. The mobile controller 230 is implemented by the OS, middleware, and various applications. A function to determine whether to store the scanned image scanned and generated by the image processing apparatus 1 in the volatile memory or the nonvolatile memory in the mobile device 2, execute storing the data, and generate a thumbnail image from the stored scanned image among functions included in the mobile controller 230 is the key point in this embodiment.

Figure 5:
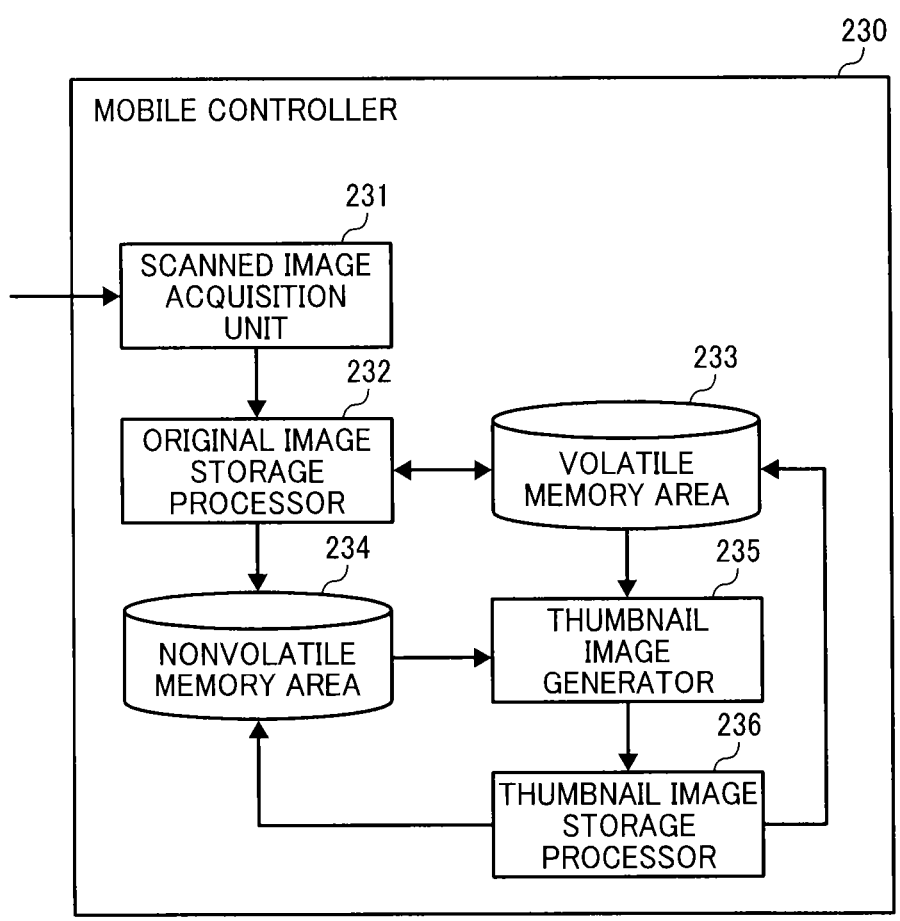
FIG. 5 is a block diagram illustrating a functional configuration of a mobile controller in the mobile device as an embodiment of the present invention.

Next, a functional configuration of the mobile controller 230 in this embodiment is described below with reference to FIG. 5. FIG. 5 is a block diagram illustrating a functional configuration of the mobile controller 230 in this embodiment. As shown in FIG. 5, the mobile controller 230 in this embodiment includes a scanned image acquisition unit 231, an original image storage processor 232, a volatile memory area 233, nonvolatile memory area 234, a thumbnail image generator 235, and a thumbnail image storage processor 236.

The scanned image acquisition unit 231 acquires scanned images as image data that the scanning function of the image processing apparatus 1 scanned and generated for each page via the network I/F 210. That is, the scanned image acquisition unit 231 functions as an image data acquisition unit that acquires image data for each page. The original image storage processor 232 determines to store the acquired scanned image for each page in either the volatile memory area 233 or the nonvolatile memory area 234 based on data size of the scanned image for a page acquired by the scanned image acquisition unit 231 and data size of the scanned images for each page already stored in the volatile memory area 233. (That will be described in detail later with reference to FIG. 6)

In addition, the original image storage processor 232 stores the scanned image for the acquired page in the determined memory area as the original image. That is, the original image storage processor 232 functions as an image data storage processor that stores the image data of the original image in either the volatile memory or the nonvolatile memory.

The volatile memory area 233 is an area in the volatile memory such as the RAM 20 shown in FIG. 2, and the original image storage processor 232 and the thumbnail image storage processor 236 (described later) can store the original images and the thumbnail images in the volatile memory area 233. The nonvolatile memory area 234 is an area in the nonvolatile memory such as the internal storage shown in FIG. 2, and the original image storage processor 232 and the thumbnail image storage processor 236 (described later) can store the original images and the thumbnail images in the nonvolatile memory area 234.

The thumbnail image generator 235 generates the thumbnail images for each page from the original images for each page stored in the volatile memory area 233 and the nonvolatile memory area 234. That is, the thumbnail image generator 235 functions as a display image generator that generates the display images of image data (original image) for each page to be displayed on the display unit of the mobile device 2.

The thumbnail image storage processor 236 stores the thumbnail images for each page generated by the thumbnail image generator 235 in the memory area where the original image that corresponds to the thumbnail image page is stored. That is to say, for example, if the scanned image for page 1 is stored in the volatile memory 233, the thumbnail image storage processor 236 the thumbnail image generated from the scanned image for page 1 in the volatile memory 233. That is, the thumbnail image storage processor 236 functions as a display image storage processor that stores the generated display image (thumbnail image) in the storage device that stores the image data (scanned image) for the page corresponding to the display image.

Figure 6:
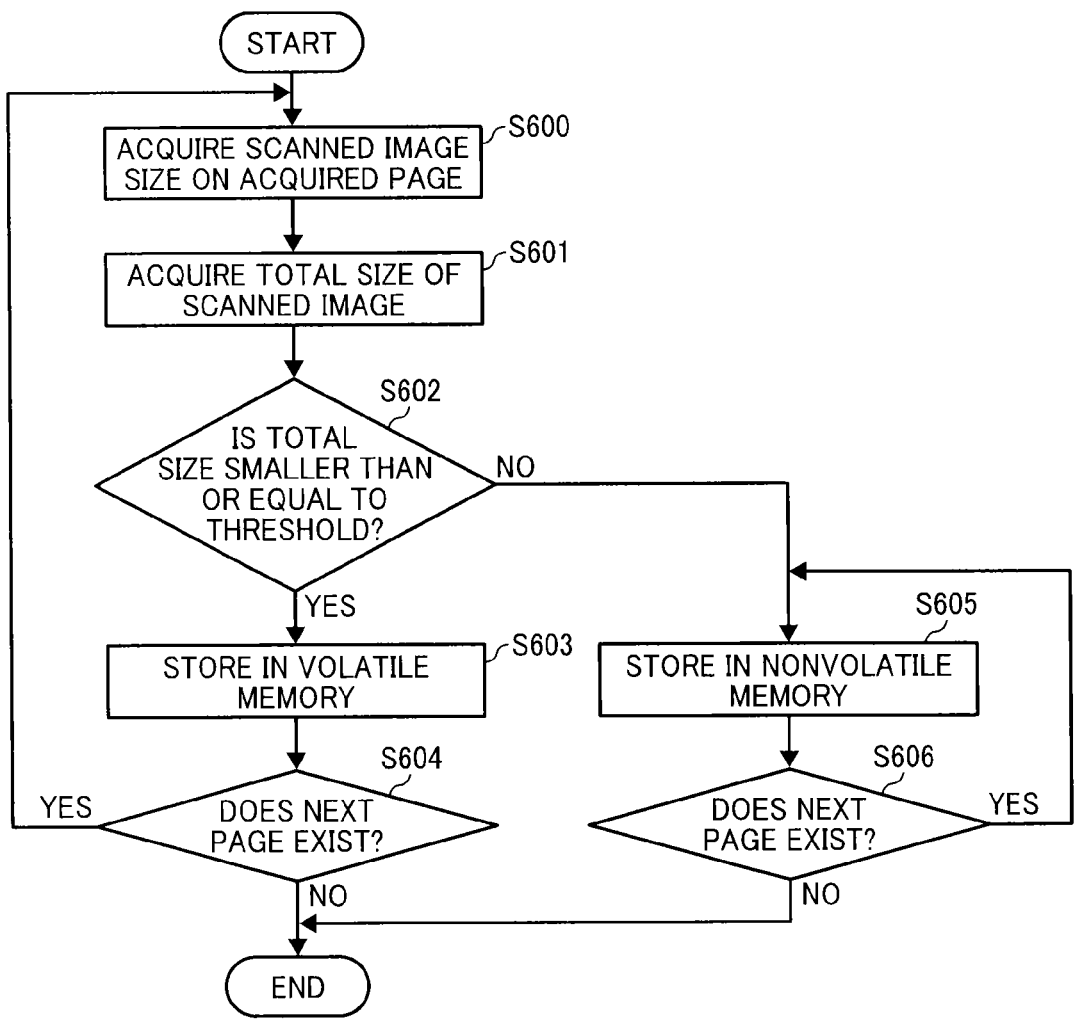
FIG. 6 is a flowchart illustrating a process of storing an original image as an embodiment of the present invention.

Next, an original image storing process executed by the original image storage processor 232 is described below with reference to FIG. 6. FIG. 6 is a flowchart illustrating a process of storing an original image executed by the original image storage processor 232. As shown in FIG. 6, the original image storage processor 232 acquires data size of scanned image in the page that the scanned image acquisition unit 231 acquires (hereinafter referred to as "scanned image size") in S600.

After acquiring the scanned image size, the original image storage processor 232 acquires total size adding scanned image sizes (original image) in each page already stored in the volatile memory area 233 and the scanned image size in the acquired page in S601. Since no original image is stored in the volatile memory area 233 at the time of acquiring the scanned image size of page 1, the total size of the scanned image is equal to the scanned image size in page 1.

After acquiring the total size of the scanned images, if the total size of the scanned images is equal to or less than a predetermined threshold value (e.g., 10 MB) (YES in S602), the original image storage processor 232 stores the scanned image in the acquired page in the volatile memory area 233 as the original image in S603. After storing the scanned image in the acquired page in the volatile memory area 233, if the scanned image acquisition unit 231 has already acquired the scanned image in the next page (YES in S604), the original image storage processor 232 acquires the scanned image size in the next page in S600 and repeats the subsequent steps until the scanned image acquisition unit 231 finishes acquiring the scanned image in the next page (NO in S604).

By contrast, if the total size of the scanned images is larger than the predetermined threshold value (NO in S602), the original image storage processor 232 stores the scanned image in the acquired page in the nonvolatile memory area 234 as the original image in S605. After storing the scanned image in the acquired page in the nonvolatile memory area 234, if the scanned image acquisition unit 231 has already acquired the scanned image in the next page (YES in S606), the original image storage processor 232 stores the scanned image in the next page in the nonvolatile memory area 234 in S605 until the scanned image acquisition unit 231 finishes acquiring the scanned image in the next page (NO in S606).

Figure 7:
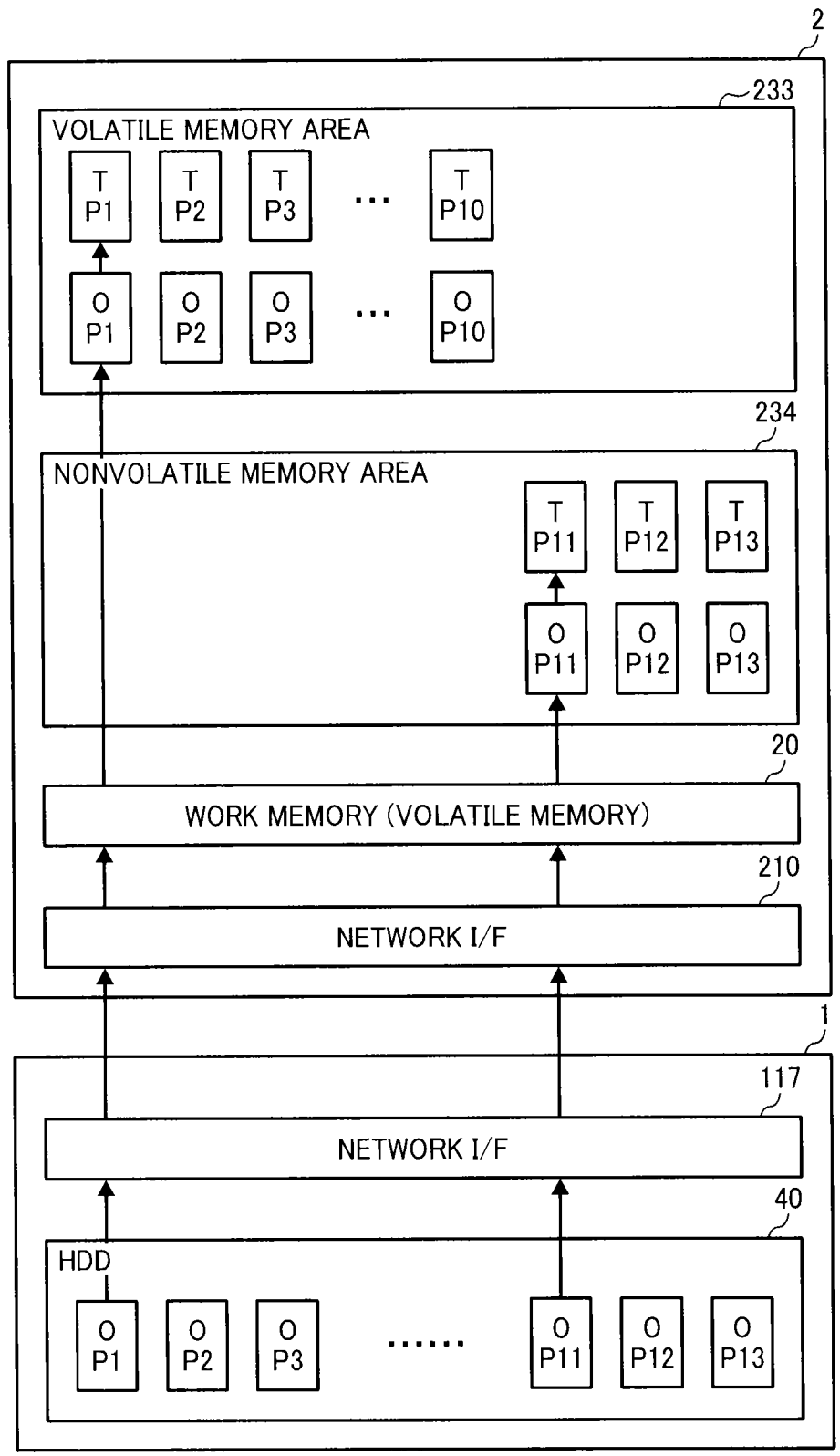
FIG. 7 is a diagram illustrating example processes of storing an original image and a thumbnail image as an embodiment of the present invention.

Next, a process of storing the original image and the thumbnail image executed by each component that comprises the mobile controller 230 described above is described below with reference to FIG. 7. FIG. 7 is a diagram illustrating an example process of storing an original image and thumbnail image executed by each component that comprises the mobile controller 230. As shown in FIG. 7, the scanned images in each page scanned and generated by the scanning function is stored in the HDD 40 in the image processing apparatus 1 as the original images. In this case, the original image in page 13 is stored in the HDD 40 in the image processing apparatus 1. (For example, the original image in page 1 is shown as "O P1").

After sending the original images for each page stored in the HDD 40 via the network I/F 117, the scanned image acquisition unit 231 acquires the sent original images for each page via the network I/F 210. Subsequently, the original image storage processor 232 determines an memory area in the volatile memory (RAM 20) as the work space where the original image for the acquired page is stored. For example, as shown in FIG. 7, the original image storage processor 232 stores the original image in page 1 in the volatile memory area 233. In this case, since the total size of the original images from page 1 to page 10 is less than the predetermined threshold value, the original images up to page 10 are stored in the volatile memory area 233.

Since the total size of the original images from page 1 to page 11 exceeds the predetermined threshold value, the original image storage processor 232 stores the original image in page 11 in the nonvolatile memory area 234 as shown in FIG. 7. Subsequently, the original images in the remaining pages are also stored in the nonvolatile memory area 234.

After the original pages in all pages stored in the HDD 40 in the image processing apparatus 1 are stored in the volatile memory area 233 or the nonvolatile memory area 234, the thumbnail image generator 235 generates thumbnail images of the original images in each page stored in the memory areas. Subsequently, the thumbnail image storage processor 236 stores the generated thumbnail images for each page in the memory area where the original image in the corresponding page is stored. That is, in this case, as shown in FIG. 7, the thumbnail images from page 1 to page 10 (for example, "T P1" indicates the thumbnail image for page 1) are stored in the volatile memory area 233, and the thumbnail images from page 11 to page 13 are stored in the nonvolatile memory area 234.

As described above, in this embodiment, the mobile device 2 acquires the scanned images for each page scanned and generated by the scanning function of the image processing apparatus 1. If the total size of the scanned image size in the acquired pages and the scanned image size for each page stored in the volatile memory area 233 is equal to or less than the predetermined threshold value, the scanned images in the acquired pages are stored in the volatile memory area 233. If the total size of the scanned image size in the acquired pages and the scanned image size for each page stored in the volatile memory area 233 exceeds the predetermined threshold value, the subsequent scanned images are stored in the nonvolatile memory area 234. In addition, the mobile device 2 generates the thumbnail images of the scanned images from the scanned images for each page stored in the memory areas.

As a result, since image data such as scanned images stored in the memory in the mobile device 2 temporarily until the process finishes is stored in the volatile memory insofar as the capacity does not run short and only image data that cannot be stored in the volatile memory is stored in the nonvolatile memory, it is possible to store the image data effectively making best use of the volatile memory suitable for temporary memory for processing and keeping usage of the nonvolatile memory that has the limit in the number of writing at a minimum.

In addition, in some cases, if all of the thumbnail images generated from the image data are stored in the volatile memory, it is possible that the volatile memory runs short. Therefore, as described above, by storing the thumbnail images for each page in the memory area where the image data corresponding to the page of the thumbnail image is stored, it is possible to store the thumbnail images effectively keeping usage of the nonvolatile memory at a minimum without running short of the volatile memory.

It should be noted that, in this embodiment, the original image storage processor 232 determines that the scanned image in the acquired page is stored either in the volatile memory area 233 or the nonvolatile memory area 234 based on the total size of the scanned image size in the acquired pages and each size of the scanned images stored in the volatile memory area 233 before storing the scanned image in the acquired page in the memory area. In other cases, first, the original image storage processor 232 can start storing the scanned image in the acquired page in the volatile memory area 233.

In this case, if the total size of the scanned images stored in the volatile memory area 233 exceeds the threshold value while the scanned image in a page is stored, the original image storage processor 232 interrupts storing the scanned image in the page in the volatile memory area 233. Subsequently, the original image storage processor 232 copies the scanned image in the page interrupted storing and stored in the volatile memory area 234 partway into the nonvolatile memory area 234. After finishing copying into the nonvolatile memory area 234, the original image storage processor 232 deletes the copied scanned image from the volatile memory area 233. After that, the original image storage processor 232 stores the remaining scanned images in the page in the nonvolatile memory area 234 storing them as the scanned image in one page.

Next, another embodiment in which the thumbnail images in each page stored in the volatile memory area 233 or the nonvolatile memory area 234 are displayed on the LCD 60 as the display unit of the mobile device 2 is described below. In order to display the thumbnail image on the display unit of the mobile device 2, it is necessary to expand the thumbnail image stored in the nonvolatile memory into the volatile memory. Therefore, in case of displaying the thumbnail image stored in the nonvolatile memory, it is not in time to expand it into the volatile memory in some cases, and it is delayed to draw the thumbnail image. However, if all of the thumbnail images are moved into the volatile memory beforehand, it is possible to run short of the capacity of the volatile memory.

Figure 8:
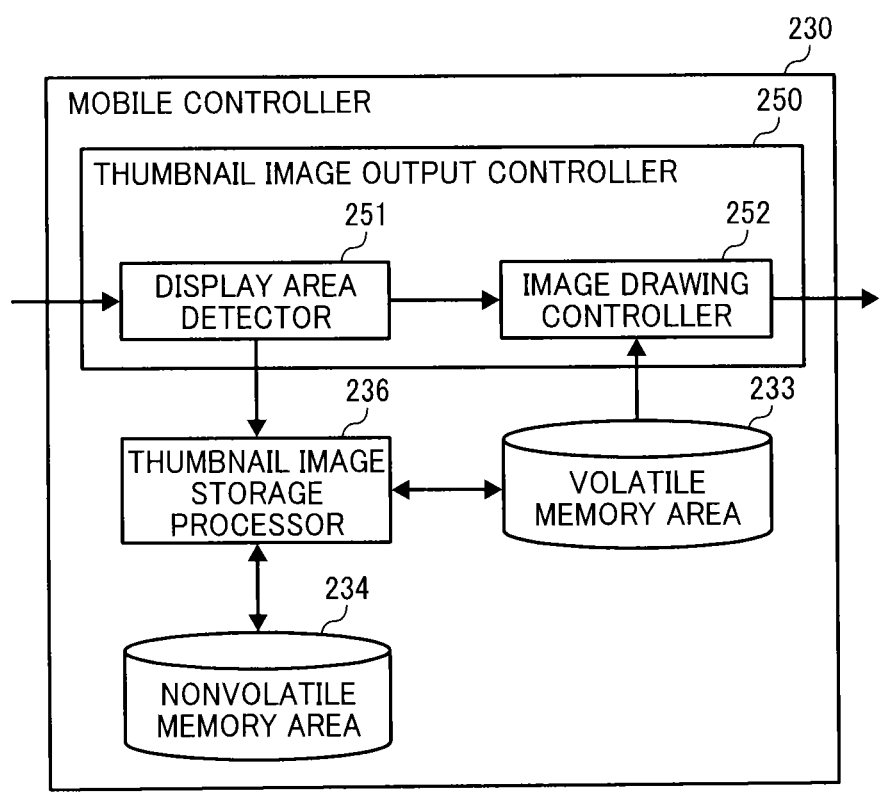
FIG. 8 is a block diagram illustrating a functional configuration of a mobile device as an embodiment of the present invention.

To cope with this issue, regardless of the number of pages of the thumbnail images, the mobile controller 230 in this embodiment prevents drawing of the thumbnail image to be displayed from delaying with keeping the usage amount of the volatile memory less than a certain level. A functional configuration of the mobile controller 230 in this embodiment is described below with reference to FIG. 8. FIG. 8 is a block diagram illustrating the functional configuration of the mobile controller 230 in this embodiment. As shown in FIG. 8, the mobile controller 230 in this embodiment includes a thumbnail image output controller 250 in addition to the configuration of the mobile controller 230 shown in FIG. 5. In addition, the thumbnail image output controller 250 includes a display area detector 251 and an image drawing controller 252.

It should be noted that the configuration only necessary for the explanation are shown in FIG. 8. In addition, in this case, the thumbnail images are drawn on the screen to be displayed in order of small page numbers from left to right. The area displayed on the LCD 60 among the screen to be displayed is determined by performing a scroll operation (display operation) using fingers or touch pen etc. on the LCD 60 of the mobile device 2, and the thumbnail images to be drawn is drawn with the displaying area on the LCD 60.

With the processes of the display area detector 251 and the image drawing controller 252 (described later), the thumbnail image output controller 250 displays the thumbnail image on the LCD 60 as the display unit of the mobile device 2. That is, the thumbnail image output controller 250 functions as a display image output controller that displays the thumbnail image as the display image on the display unit of the mobile device 2.

The display area detector 251 acquires the operational information such as the scroll operation performed on the operational unit 70 via the operation controller 202 and detects the area displayed on the LCD 60 among the screen to be displayed based on the acquired operational information. More specifically, for example, the display area detector 251 detects position coordinates that indicate the area of the screen displayed on the LCD 60 (e.g., four coordinates of vertexes of the rectangular that indicates the area of the screen to be displayed) from distance of the scroll operation.

Based on the position coordinates input from the display area detector 251, the thumbnail image storage processor 236 specifies the thumbnail image to be moved into the volatile memory area 233 and expands the specified thumbnail image stored in the nonvolatile memory area 234 into the volatile memory area 233. (That will be described in detail later with reference to FIG. 9.) In addition, the thumbnail image storage processor 236 releases memory area where unnecessary thumbnail image is expanded among thumbnail images moved into the volatile memory area 233 based on the position coordinates input from the display area detector 251. (That will also be described in detail later with reference to FIG. 9.) After acquiring the thumbnail image to be drawn within the display area indicated by the position coordinates input from the display area detector 251 from the volatile memory area 233, the image drawing controller 252 draws the acquired thumbnail image on the LCD 60 via the display controller 203. It should be noted that layout positions for each of the thumbnail images in each page on the screen to be displayed are stored in a storage device such as layout position information database (not shown in figures) as layout position coordinates. The thumbnail images whose layout position coordinates are with the display area are considered as the thumbnail images to be drawn within the display area.

Figure 9:
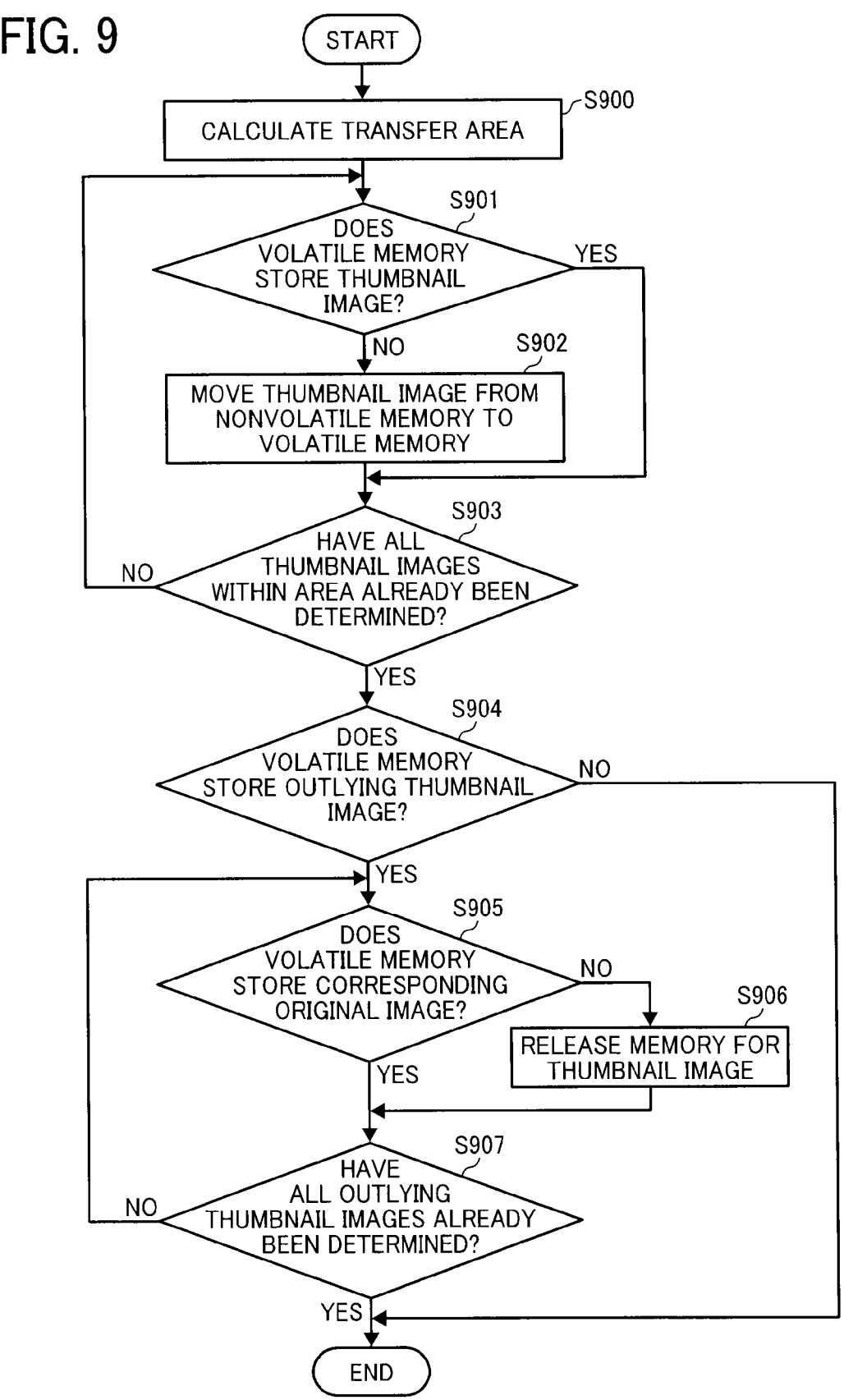
FIG. 9 is a flowchart illustrating processes of moving the thumbnail image into memory and releasing memory as an embodiment of the present invention.

Next, a memory expanding process and a memory releasing process of the thumbnail images executed by the thumbnail image storage processor 236 is described with reference to FIG. 9. FIG. 9 is a flowchart illustrating processes of expanding the thumbnail image into memory and releasing memory executed by the thumbnail image storage processor 236. As shown in FIG. 9, based on the display area that the position coordinates input from the display area detector 251, the thumbnail image storage processor 236 calculates an area where the thumbnail images should be moved into the volatile memory area 233 (hereinafter referred to as "transfer area") among the screen to be displayed in S900.

The transfer area is an area that adds the display area indicated by the position coordinates to a predetermined area horizontally centering around the display area (hereinafter referred to as "backup area") (e.g., width is 1800 dots and height is the same as the display area). The reason that the thumbnail images that should be drawn with the backup area should also be moved into the volatile memory area 233 is to prevent the drawing process from delaying since it is impossible to make it in time to expand the thumbnail images to be drawn with the backup area into the volatile memory area 233 if the display area moves to the adjacent backup area due to the scroll operation.

After calculating the transfer area, the thumbnail image storage processor 236 determines whether or not the thumbnail images for each page to be drawn with the calculated transfer area are stored in the volatile memory area 233 sequentially (e.g., in order of the page number from small to large). It should be noted that the layout positions for each thumbnail image in each page on the screen to be displayed are stored in the storage device such as the layout position information database (not shown in figures) as the layout position coordinates as described above, and the thumbnail images whose layout position coordinates are within the transfer area are considered as the thumbnail images to be drawn within the transfer area (the thumbnail images to be determined).

If the thumbnail image to be determined is stored in the volatile memory area 233 (YES in S901), the thumbnail image storage processor 236 does not expand the thumbnail image since it is unnecessary to expand it into the volatile memory area 233 newly. By contrast, if the thumbnail image to be determined is not stored in the volatile memory area 233 (NO in S901), the thumbnail image storage processor 236 expands the thumbnail image from the nonvolatile memory area 234 into the volatile memory area 233 since the thumbnail image to be determined is stored in the nonvolatile memory area 234 in S902.

Next, if there is a thumbnail image that has not been determined yet among thumbnail images to be determined (NO in S903), the thumbnail image storage processor 236 performs the step in S901 on the thumbnail image that has not been determined yet. By contrast, if all of the thumbnail images that should be drawn within the calculated transfer area are determined (YES in S903), the thumbnail image storage processor 236 determines whether or not the process to release memory for the thumbnail image moved into the volatile memory area 233 is performed as described above.

If the thumbnail images that should be drawn out of the transfer area are moved into the volatile memory area 233 (YES in S904), the thumbnail image storage processor 236 determines whether or not the original image that corresponds to each page of those thumbnail images is stored in the volatile memory area 233 sequentially in S905. If the original image that corresponds to the page of the thumbnail image to be determined is stored in the volatile memory area 233 (YES in S905), the thumbnail image storage processor 236 does not perform releasing memory area since the thumbnail image is originally stored in the volatile memory area 233.

By contrast, if the original image that corresponds to the page of the thumbnail image to be determined is not stored in the volatile memory area 233 (NO in S905), the thumbnail image storage processor 236 releases the volatile memory area where the thumbnail image is stored since the thumbnail image was moved into the volatile memory area 233 for drawing in S906. If there is a thumbnail image that has not been determined in S905 yet among the thumbnail images that should be drawn out of the transfer area (NO in S907), the step in S905 is performed on the thumbnail images that has not been determined yet. By contrast, if the step in S905 is performed on all of the thumbnail images that should be drawn out of the transfer area (YES in S907), the process ends.

Figure 10:
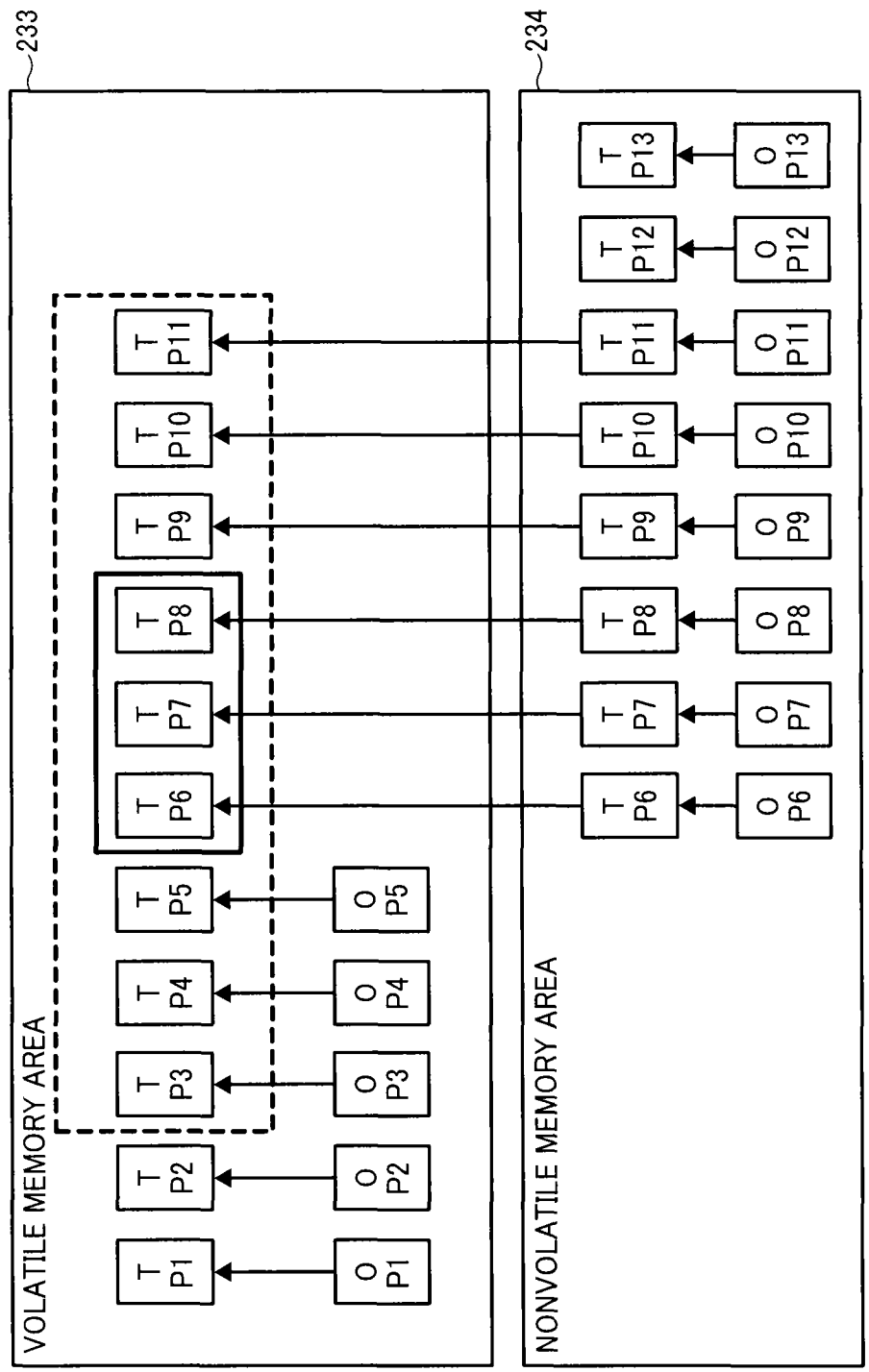
FIG. 10 is a diagram illustrating processes of moving the original image and the thumbnail image into memory and releasing memory as an embodiment of the present invention.
Figure 11:
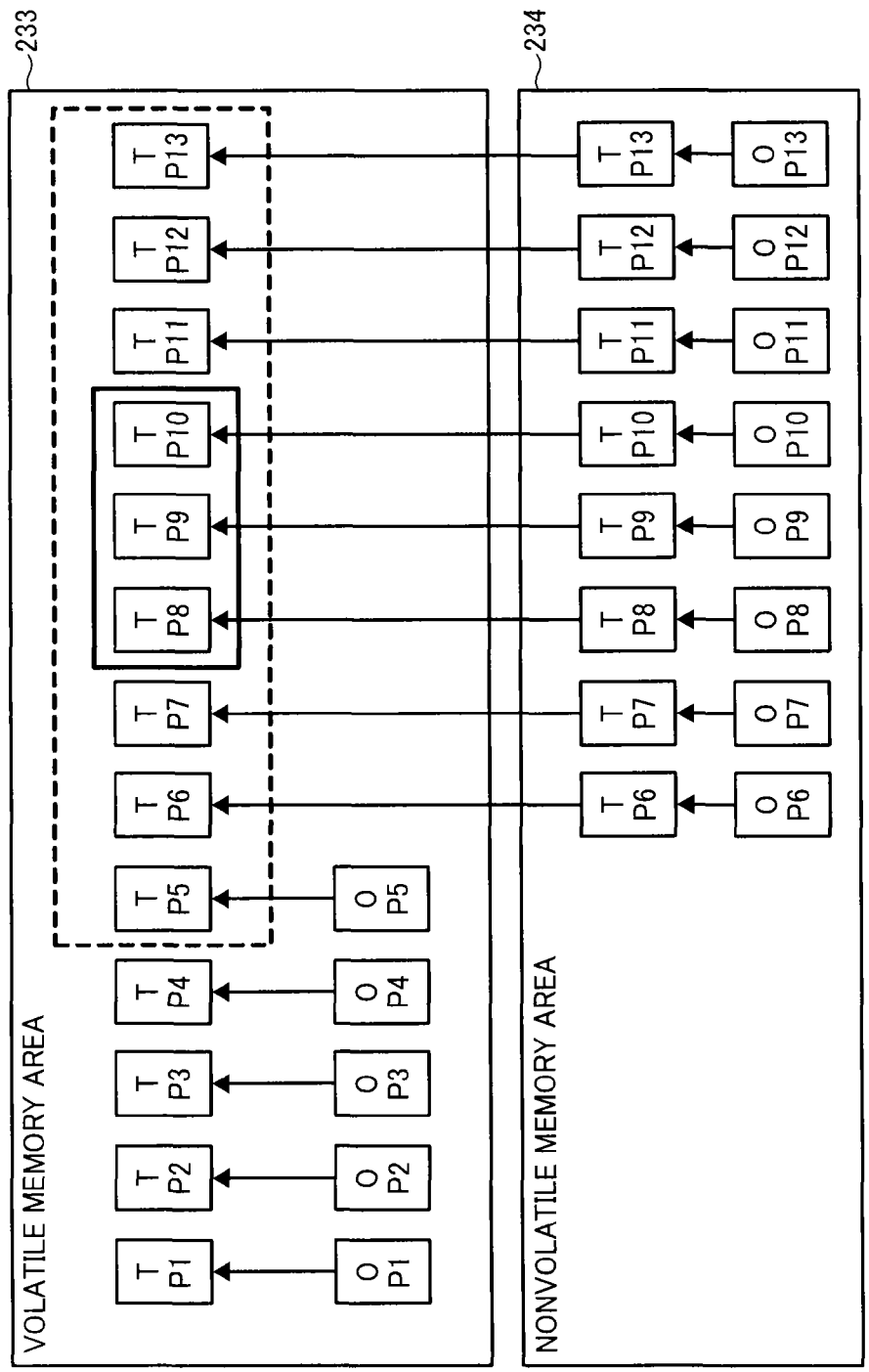
FIG. 11 is a diagram illustrating processes of moving the original image and the thumbnail image into memory and releasing memory as an embodiment of the present invention.
Figure 12:
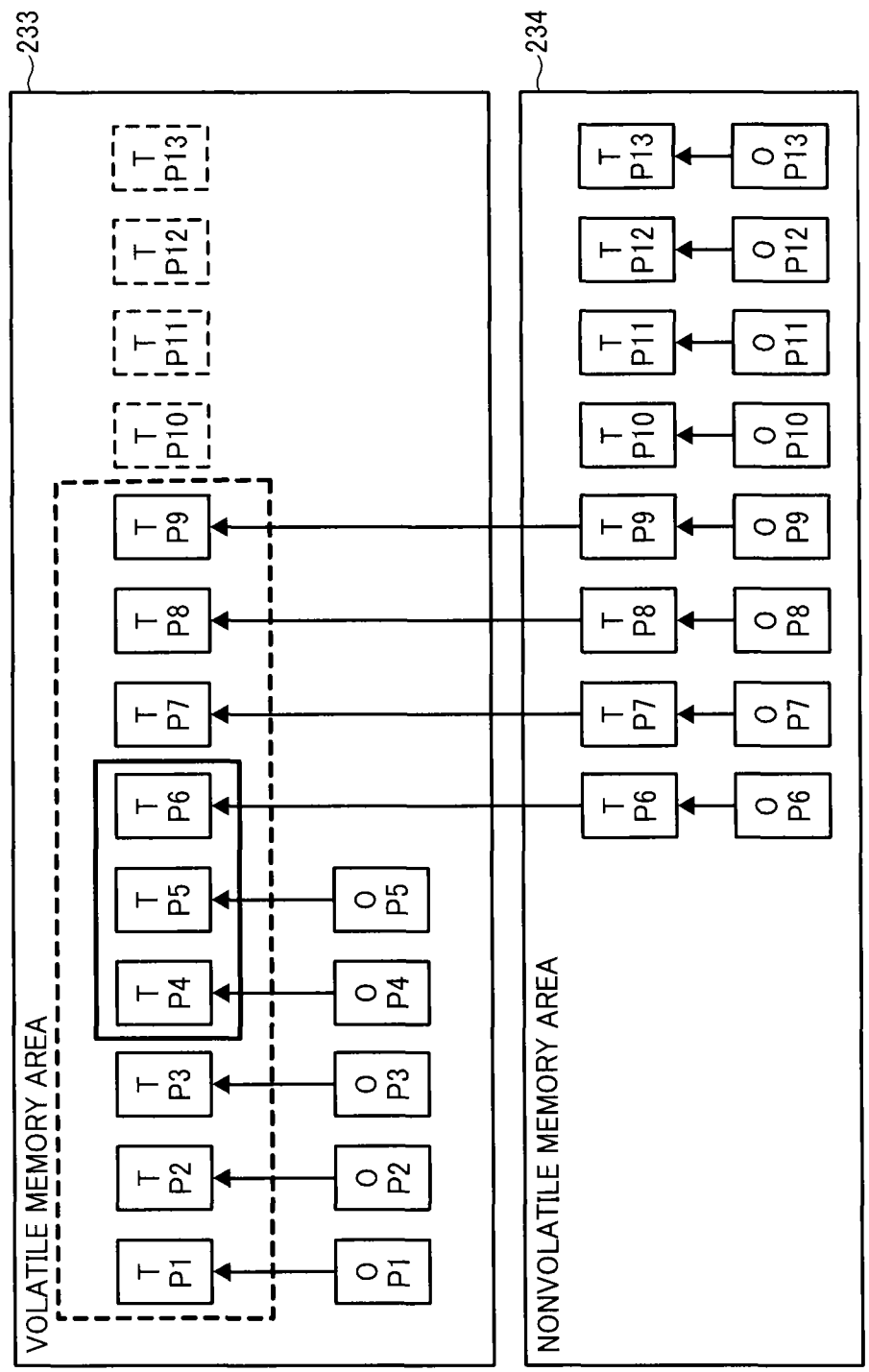
FIG. 12 is a diagram illustrating processes of moving the original image and the thumbnail image into memory and releasing memory as an embodiment of the present invention.

Next, processes of expanding the original image and the thumbnail image into memory and releasing memory are described below with reference to FIG. 10, FIG. 11, and FIG. 12. FIG. 10, FIG. 11, and FIG. 12 are diagrams illustrating processes of expanding the original image and the thumbnail image into memory and releasing memory as an embodiment of the present invention. In the description shown below, it is assumed that the original images and thumbnail images for page 1 to page 5 are stored in the volatile memory area 233, and the original images and thumbnail images for page 6 to page 13 are stored in the nonvolatile memory area 234. In addition, on the screen to be displayed, the thumbnail images are laid out at even intervals in the order of the number of pages lining up in single file from left to right.

As shown in FIG. 10, thumbnail images included in the area surrounded by the rectangular with solid lines indicate the thumbnail images that should be drawn in the display area displayed on the LCD 60, and thumbnail images included in the area surrounded by the rectangular with broken lines indicate the thumbnail images that should be drawn in the transfer area that includes the backup area. For example, the thumbnail images that should be drawn in the transfer area shown in FIG. 10 are the thumbnail images from page 3 to page 11.

Since the thumbnail images from page 3 to page 5 are originally stored in the volatile memory area 233 among these thumbnail images, it is unnecessary to perform the expanding process. By contrast, since the thumbnail images from page 6 to page 11 are not stored in the volatile memory area 233, the thumbnail image storage processor 236 expands these thumbnail images from the nonvolatile memory area 234 into volatile memory area 233 as shown in FIG. 10.

Next, a case in which the display area is moved by the scroll operation is described below with reference to FIG. 11. As shown in FIG. 11, the thumbnail images that should be displayed in the display area are thumbnail images from page 8 to page 10, and the display area is scrolled to the right direction from the display area shown in FIG. 10. Therefore, as shown in FIG. 11, the thumbnail images that should be drawn in the transfer area are the thumbnail images from page 5 to page 13 moved to the right direction.

In accordance with the scroll move described above, the thumbnail image storage processor 236 expands the thumbnail images for pages 12 and 13 that are not stored in the volatile memory area 233 from the nonvolatile memory area 234 into the volatile memory area 233 as shown in FIG. 11. It should be noted that the thumbnail images from page 6 to page 11 are already included in the transfer area shown in FIG. 10, and they are already moved into the volatile memory area 233. In addition, from the above description, the thumbnail images from page 8 to page 11 that should be drawn in the display area shown in FIG. 11 can be drawn immediately when the display area is scrolled to the display area shown in FIG. 11. By contrast, since the thumbnail images for pages 3 and 4 that become out of the transfer area due to the scroll move are originally stored in the volatile memory area 233, the memory releasing process is not performed.

Next, a case in which the display area is further moved by the scroll operation is described below with reference to FIG. 12. As shown in FIG. 12, the thumbnail images that should be displayed in the display area are thumbnail images from page 4 to page 6, and the display area is scrolled to the left direction from the display area shown in FIG. 11. Therefore, as shown in FIG. 12, the thumbnail images that should be drawn in the transfer area are the thumbnail images from page 1 to page 9 moved to the left direction.

In the case of the scroll move described above, the thumbnail images from page 1 to page 9 that should be drawn in the transfer area shown in FIG. 12 are already moved into the volatile memory area 233, and the expanding process is not performed. By contrast, the thumbnail images from page 10 to page 13 that become out of the transfer area due to the scroll move are originally stored in the nonvolatile memory area 234 since the original images for page 10 to page 13 are stored in the nonvolatile memory area 234. Consequently, as shown in FIG. 12, the thumbnail image storage processor 236 releases memory for these thumbnail images in the volatile memory area 233.

With the configuration described above, in the mobile device 2, not only the thumbnail images that should be drawn in the display area on the LCD 60 but also the thumbnail images that should be drawn in the backup area on the basis of the display area are moved into the volatile memory area 233. By contrast, among the thumbnail images that should be drawn out of these areas, the thumbnail images expanded from the nonvolatile memory area 234 into the volatile memory area 233 are released in the volatile memory area 233. Therefore, regardless of the number of pages of thumbnail images to be displayed, it is possible to keep the usage amount of the volatile memory under a certain amount. Therewith, since the thumbnail images that should be drawn in the backup area are moved into the volatile memory area 233, it is possible to prevent drawing of the thumbnail images from delaying even if the display area is moved by the scroll operation etc.

In the embodiment described above, the thumbnail image storage processor 236 determines whether or not the thumbnail images for each page that should be drawn in the transfer area are stored in the volatile memory area 233 in the order of the page number from smallest to largest. Other than that, it is possible to perform the determination process described above setting high priority to the thumbnail images for each page that should be drawn in the display area compared to the thumbnail images for each page that should be drawn in the backup area. In this case, the determination process is performed in the order of the page number for each page that should be drawn in the display area from smallest to largest. Subsequently, the determination process is performed in the order of the page number for each page that should be drawn in the backup area from smallest to largest. Otherwise, it is not limited to perform the determination process in the order of the page number from smallest to largest. In the backup area, it is possible to perform the determination process in the order of the page number near to the page number that should be drawn in the display area. In addition, it is possible to perform the determination process in the order in accordance with the scroll direction.

In the embodiment described above, on the screen to be displayed, the thumbnail images are laid out lining up in single file from left to right in the order of the page number from smallest to largest. However, this is just an example, and the thumbnail images can be laid out in any role such as drawing the thumbnail images in tandem in the order of the page number from smallest to largest on the screen to be displayed and drawing the thumbnail images in the array of five by five (in the array of two by two in the display area). The direction of the backup area against the display area is determined in accordance with the array of the thumbnail images or the scroll direction on the screen to be displayed.

In the embodiment described above, after expanding the thumbnail images that should be drawn in the transfer area into the volatile memory area 233, the thumbnail image storage processor 236 releases the thumbnail images that should be drawn outside of the transfer area in the volatile memory area 233. However, these steps can be performed vice versa.

In the embodiment described above, not only the thumbnail images stored in the nonvolatile memory area 234 are moved into the volatile memory area 233, but also it is possible to rotate those thumbnail images if needed. In this case, after allocating memory area for rotating in the volatile memory area 233, the thumbnail image storage processor 236 expands the thumbnail image stored in the nonvolatile memory area 234 into the allocated memory area. Subsequently, a rotation processor (not shown in figures) rotates the thumbnail image in the allocated memory area, and the thumbnail image storage processor 236 expands the rotated thumbnail image into the volatile memory area 233 and releases the memory area allocated for the rotation process.

Regarding the rotated thumbnail image that became outside of the transfer area due to the move of the display area, if the corresponding original image is stored in the volatile memory area 233, the thumbnail image storage processor 236 keeps expanding the rotated thumbnail image in the volatile memory area 233. By contrast, if the corresponding original image is stored in the nonvolatile memory area 234, the thumbnail image storage processor 236 releases the rotated thumbnail image that became outside of the transfer area in the volatile memory area 233.

Figure 13:
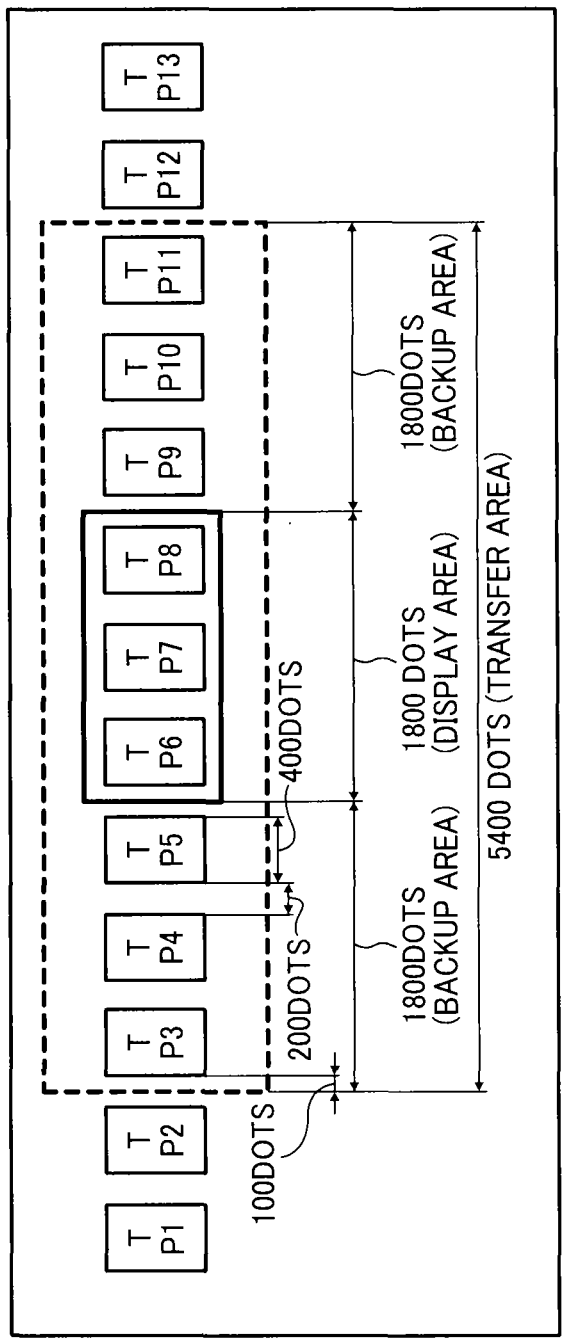
FIG. 13 is a diagram illustrating a data transfer area as an embodiment of the present invention.

Next, another embodiment that modifies the transfer area described above in accordance with velocity of scrolling (hereinafter referred to as "scroll velocity") is described below. In the embodiments described above, the backup area is fixed at a predetermined size. For example, as shown in FIG. 13, the width of the display area is defined as 1800 dots, and the width of the backup area is also defined as 1800 dots. In this case, the transfer area is 5400 dots adding the width of the display area and the backup areas beside the display area. If the width of the thumbnail image for one page is 400 dots and the layout interval between the adjacent thumbnail images is 200 dots, three pages of thumbnail images are drawn in both the display area and the backup area.

As described above, in case of fixing the backup area, if the screen is scrolled faster than estimated scroll velocity, the display area is moved to an area where the thumbnail images are not moved into the volatile memory area 233, and that results in delaying drawing. To cope with this issue, by modifying the backup area in accordance with the scroll velocity, it is possible to prevent delay in drawing since the display area is moved and the thumbnail images that should be drawn in that area cannot be moved into the volatile memory area 233 in time.

The backup area indicates the area that can be moved to by the time of finishing moving the thumbnail image into the volatile memory area 233. Therefore, the backup area in accordance with the scroll velocity can be calculated using the following equation (1) that uses the scroll velocity and time needed to move the thumbnail image into the volatile memory area 233.

$$\text{backup area(dots)} = \text{scroll velocity}\left(\frac{dot}{msec}\right) \times \text{expansion time}(msec) \quad \text{Equation (1)}$$

In calculating the transfer area in S900, the thumbnail image storage processor 236 acquires the scroll velocity of the scroll operation on the operational unit 70 via the operation controller 202. Subsequently, the thumbnail image storage processor 236 calculates the backup area applying the acquired scroll velocity and predetermined expansion time (in this case, it is assumed that the expansion time is 50 msec) to Equation (1). For example, if the acquired scroll velocity is 30 dot/msec, the backup area is calculated as 1500 dots. For example, if an initial value of the backup area is 1800 dots, the backup area is not modified since the calculated backup area is smaller than the initial value, and the transfer area is calculated as 5400 dots as shown in FIG. 13.

Figure 14:
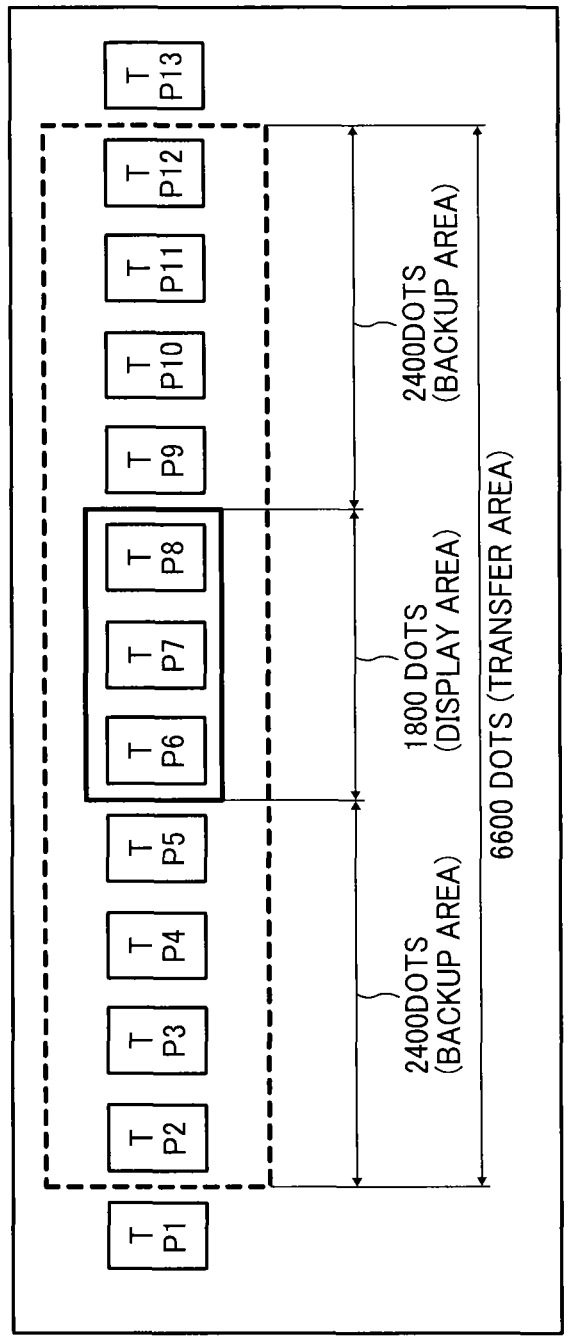
FIG. 14 is a diagram illustrating a data transfer area as an embodiment of the present invention.

By contrast, for example, if the acquired scroll velocity is 48 dot/msec, the backup area is calculated as 2400 dots. In this case, since the calculated backup area is larger than 1800 dots as the initial value, the thumbnail image storage processor 236 modifies the backup area from 1800 dots into 2400 dots. Subsequently, as shown in FIG. 14, the thumbnail image storage processor 236 calculates the transfer area as 6600 dots adding the display area 1800 dots and the backup areas 2400 dots.

By adopting the configuration described above, even if the display area is scrolled with the scroll velocity faster than the supposed scroll velocity, since the backup area is moved in accordance with the scroll velocity, it is highly possible that the thumbnail images that should be drawn in the moved display area as already been moved into the volatile memory area 233, and it is possible to prevent delay in drawing the thumbnail images.

In the embodiment described above, in calculating the transfer area, the thumbnail image storage processor 236 acquires the scroll velocity via the operation controller 202 and calculates the backup area based on the acquired scroll velocity. In other cases, if a user logs in the mobile device 2 after user authentication, the thumbnail image storage processor 236 can store the calculated backup area in the nonvolatile memory associated with the user name who logs in when the user finishes the operation or logs off. In this case, next time the user logs in the mobile device 2, the backup area stored in the nonvolatile memory is applied as the initial value for the backup area, and that can improve the user convenience.

In the embodiment described above, the scanned image scanned and generated by the scanning function included in the image processing apparatus 1 and the thumbnail images generated from the scanned images area stored in the mobile device and processed. However, this is just an example, and it is possible to apply the process described above to cases in which the image data processed by the image processing apparatus 1 is stored in the mobile device and processed such as images received by the fax function are stored in the mobile device and processed etc.

In the embodiment described above, the mobile controller 230 in the mobile device 2 performs processes described above. However, the image processing apparatus 1 can perform processes such as the process to determine that the original images are stored in either the volatile memory area 233 or the nonvolatile memory area 234 and the process to generate the thumbnail images. In addition, in the image processing system, an application server (not shown in figures) connected to the image processing apparatus 1 and the mobile device 2 via the network can perform all of the processes or a part of the processes.

The present invention also encompasses a method of controlling an information processing device that is separate from an image processing apparatus and which controls operation of the image processing apparatus and includes volatile memory and a nonvolatile memory. The information processing device control method includes the steps of acquiring image data processed by the image processing apparatus for each page, comparing the image data acquired by the image data acquisition unit for each page with image data already stored in the volatile memory and determine whether to store the image data acquired by the image data acquisition unit for each page in the volatile memory or the nonvolatile memory, generating display image to be displayed on a display unit of the information processing device based on the image data for each page stored in either the volatile memory or the nonvolatile memory, and displaying the display image generated by the display image generator on the display unit of the information processing device.

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

Each of the functions of the described embodiments may be implemented by one or more processing circuits. A processing circuit includes a programmed processor, as a processor includes circuitry. A processing circuit also includes devices such as an application-specific integrated circuit (ASIC) and conventional circuit components arranged to perform the recited functions.

What is claimed is:

1. An information processing device that is separate from an image processing apparatus and which controls operation of the image processing apparatus, the image processing device comprising:
   a volatile memory that stores image data;
   a nonvolatile memory;
   a display;
   an image data acquisition circuit that acquires image data processed by the image processing apparatus page by page;
   an image data storage processing circuit that compares the image data acquired by the image data acquisition circuit for each page with the image data stored in the volatile memory and stores the image data acquired by the image data acquisition circuit for each page in either the volatile memory or the nonvolatile memory based on comparison;
   a display image generating circuit that generates a display image to be displayed on the display based on the image data for each page stored in either the volatile memory or the nonvolatile memory;
   a display image output controlling circuit that controls the display to display the display image generated by the display image generator; and
   a display image storage processing circuit that stores the display image generated by the display image generating circuit in the memory that stores the image data for the page corresponding to the display image, wherein
   the display image output controlling circuit includes:
      a display area detecting circuit that detects an area of a screen to be displayed on the display in which a layout position of the display image that should be displayed on the display is set, and
      an image drawing controlling circuit that draws the display image of the page whose layout position is set within the detected area and controls the display to display the drawn display image,
   the image data storage processing circuit is configured to:
      specify the display image of a page that should be stored in the volatile memory among the display images stored in the nonvolatile memory,
      store the specified display image in the volatile memory, and
      delete the display image for another page in the volatile memory when the display image for the other page is stored in both the volatile memory and the nonvolatile memory, and
   the image drawing controlling circuit acquires the display image stored in the volatile memory and draws the display image for the page whose layout position is set in the detected area.

2. The information processing device according to claim 1, wherein the image data storage processing circuit calculates total size of the image data acquired by the image data acquisition circuit for each page and size of image data already stored in the volatile memory and stores the acquired image data and image data for remaining pages acquired subsequently in the nonvolatile memory when the calculated total size exceeds a predetermined threshold value.

3. The information processing device according to claim 1, wherein the image data storage processing circuit starts storing the image data acquired by the image data acquisition circuit for each page in the volatile memory and stores the image data that was partially stored in the volatile memory and the remaining image data in the nonvolatile memory when the total size of the image data stored in the volatile memory exceeds a predefined threshold value during the storing process.

4. The information processing device according to claim 1, wherein the display image storage processing circuit determines an area where the display image is specified as the display image for a target page that should be stored in the volatile memory in accordance with user operation on the screen to be displayed and specifies the display image for the page whose layout position is set within the determined area as the display image that should be stored in the volatile memory.

5. The information processing device according to claim 4, wherein the display image storage processing circuit stores the determined area in the nonvolatile storage area associated with the user who performed the user operation and specifies the display image for the page whose layout position is set within the stored area associated with the user who performs user operation on another screen to be displayed as the display image for the target page in specifying the display image for the target page that should be stored in the volatile memory among the display images whose layout positions are set in the other screen to be displayed.

6. An image processing system comprising:
   the information processing device of claim 1; and
   the image processing apparatus.

7. A method of controlling an information processing device that is separate from an image processing apparatus and which controls operation of the image processing apparatus, the image processing device including a display, a volatile memory, and a nonvolatile memory, the method comprising:
   acquiring, by an image data acquisition circuit of the information processing device, image data processed by the image processing apparatus for each page;
   comparing, by an image data storage processing circuit of the information processing device, the image data acquired by the image data acquisition circuit for each page with image data already stored in the volatile memory to determine whether to store the image data acquired by the image data acquisition circuit for each page in the volatile memory or in the nonvolatile memory;

generating, by a display image generating circuit of the information processing device, a display image to be displayed on the display based on the image data for each page stored in either the volatile memory or the nonvolatile memory;

controlling, by a display image output controlling circuit of the information processing device, the display to display the display image generated by the display image generating circuit; and storing, by a display image storage processing circuit of the information processing device, the display image generated by the display image generating circuit in the memory that stores the image data for the page corresponding to the display image, wherein the controlling of the display to display the display image includes:
- detecting an area of a screen to be displayed on the display in which a layout position of the display image that should be displayed on the display is set,
- acquiring the display image stored in the volatile memory,
- drawing the display image of the page whose layout position is set within the detected area, and
- controlling the display to display the drawn display image, and the comparing of the image data includes:
- specifying the display image of a page that should be stored in the volatile memory among the display images stored in the nonvolatile memory,
- storing the specified display image in the volatile memory, and
- deleting the display image for another page in the volatile memory when the display image for the other page is stored in both the volatile memory and the nonvolatile memory.

8. A non-transitory, computer-readable recording medium storing a program that, when executed by an information processing device that is separate from an image processing apparatus and which controls operation of the image processing apparatus the image processing device including processing circuitry, a display, a volatile memory, and a nonvolatile memory, causes the information processing device to perform a method, the method comprising:

acquiring image data processed by the image processing apparatus for each page;

comparing the image data for each page with image data already stored in the volatile memory to determine whether to store the image data for each page in the volatile memory or in the nonvolatile memory;

generating by a display image generating circuit a display image to be displayed on the display based on the image data for each page stored in either the volatile memory or the nonvolatile memory;

controlling the display to display the display image generated by the display image generating circuit; and storing the display image in the memory that stores the image data for the page corresponding to the display image, wherein the controlling of the display to display the display image includes:
- detecting an area of a screen to be displayed on the display in which a layout position of the display image that should be displayed on the display is set,
- acquiring the display image stored in the volatile memory,
- drawing the display image of the page whose layout position is set within the detected area, and
- controlling the display to display the drawn display image, and the comparing of the image data includes:
- specifying the display image of a page that should be stored in the volatile memory among the display images stored in the nonvolatile memory,
- storing the specified display image in the volatile memory, and
- deleting the display image for another page in the volatile memory when the display image for the other page is stored in both the volatile memory and the nonvolatile memory.

\* \* \* \* \*